(12) United States Patent
Dufosse et al.

(10) Patent No.: US 7,107,016 B2
(45) Date of Patent: Sep. 12, 2006

(54) COMPONENT FOR A WIRELESS COMMUNICATION TERMINAL CONSTITUTING AN ANTENNA, LOUDSPEAKER AND RINGER

(75) Inventors: Stéphane Dufosse, Cormeilles en Parisis (FR); Pascal Herve, Asnieres sur Seine (FR); José Marie Baro, Taverny (FR); Bertrand Cupif, Antony (FR)

(73) Assignee: TCL Communications Technology Holdings Limited, Kowloon (HK)

( * ) Notice: Subject to any disclaimer, the term of this patent is extended or adjusted under 35 U.S.C. 154(b) by 453 days.

(21) Appl. No.: 10/241,430

(22) Filed: Sep. 12, 2002

(65) Prior Publication Data

US 2003/0068987 A1    Apr. 10, 2003

(30) Foreign Application Priority Data

Sep. 13, 2001    (FR) .................................. 01 11853

(51) Int. Cl.
*H04B 1/38*    (2006.01)
(52) U.S. Cl. .................... 455/90; 455/90.2; 455/575.7; 455/550.1; 343/700; 343/702
(58) Field of Classification Search ................ 343/702, 343/700; 455/90, 89, 575, 575.5, 90.2, 550.1, 455/569.1
See application file for complete search history.

(56) References Cited

U.S. PATENT DOCUMENTS

| 4,719,322 | A | * | 1/1988 | Guzik et al. ................. 200/5 A |
| 5,524,284 | A | * | 6/1996 | Marcou et al. ........... 455/575.7 |
| 6,201,501 | B1 | | 3/2001 | Arkko et al. |
| 6,603,431 | B1 | * | 8/2003 | Talvitie et al. ............... 343/702 |
| 2001/0017922 | A1 | * | 8/2001 | Kim ............................ 381/150 |
| 2003/0003970 | A1 | * | 1/2003 | Johnson et al. ............. 455/569 |

FOREIGN PATENT DOCUMENTS

| EP | 0 924 793 A2 | 6/1999 |
| EP | 1 184 936 A1 | 3/2002 |
| WO | WO 00/30268 A1 | 5/2000 |
| WO | WO 00/74172 A1 | 12/2000 |

\* cited by examiner

*Primary Examiner*—George Eng
*Assistant Examiner*—Nam Huynh
(74) *Attorney, Agent, or Firm*—Sughrue Mion, PLLC

(57) ABSTRACT

A structural arrangement for a wireless communication terminal includes a case in which are disposed a sound transducer and a patch planar antenna connected to a printed circuit. The transducer has an electrically neutral portion comprising a vibrating membrane and an electrically conductive portion. The antenna incorporates a cavity delimited by a ground plane and a conductive patch disposed on a dielectric support. The electrically neutral portion of the sound transducer is situated in the cavity of the antenna. The electrically conductive portion of the sound transducer constitutes a portion of the ground plane of the antenna.

9 Claims, 3 Drawing Sheets

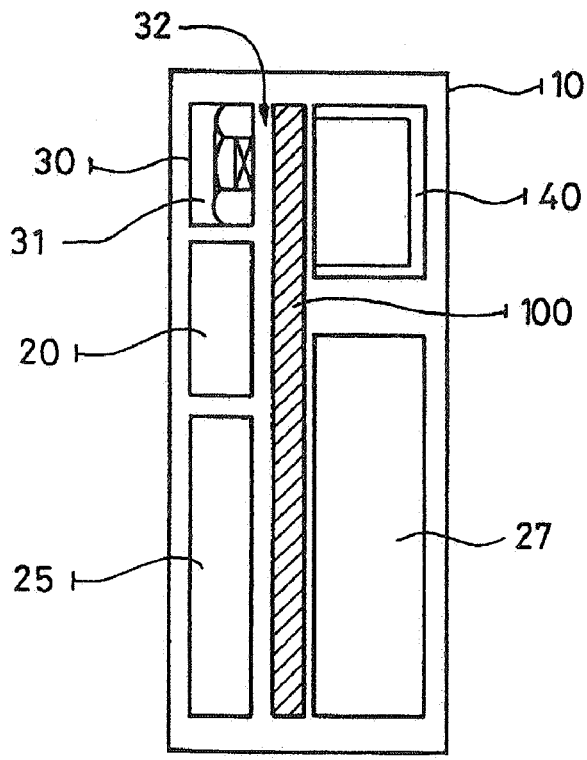
FIG_1
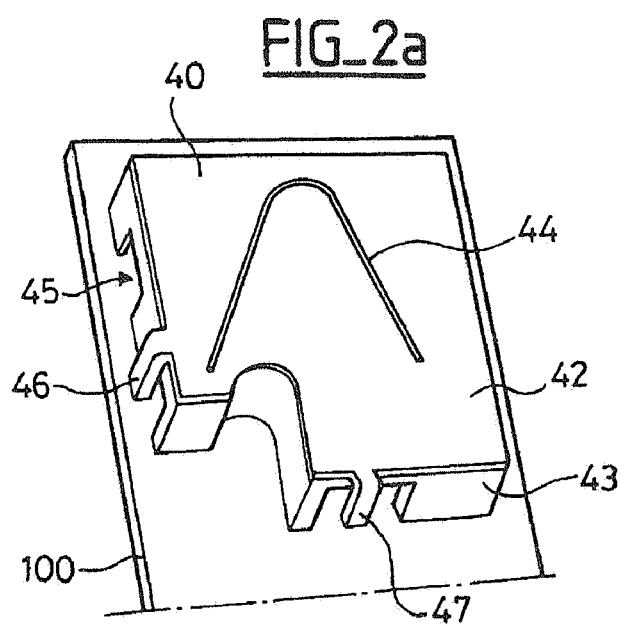
FIG_2a
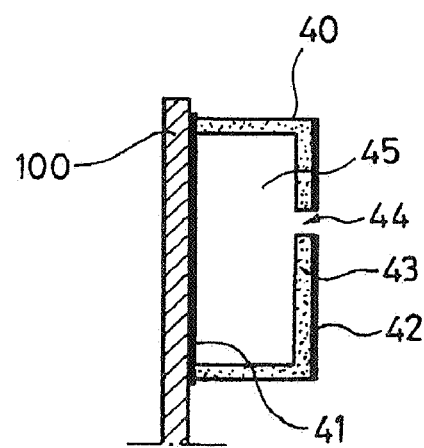
FIG_2b

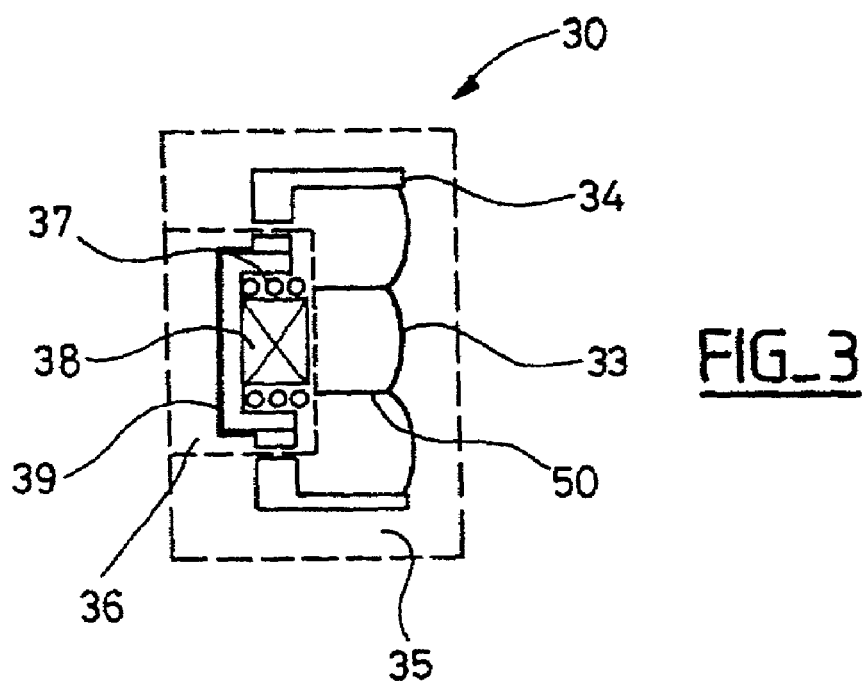
FIG_3
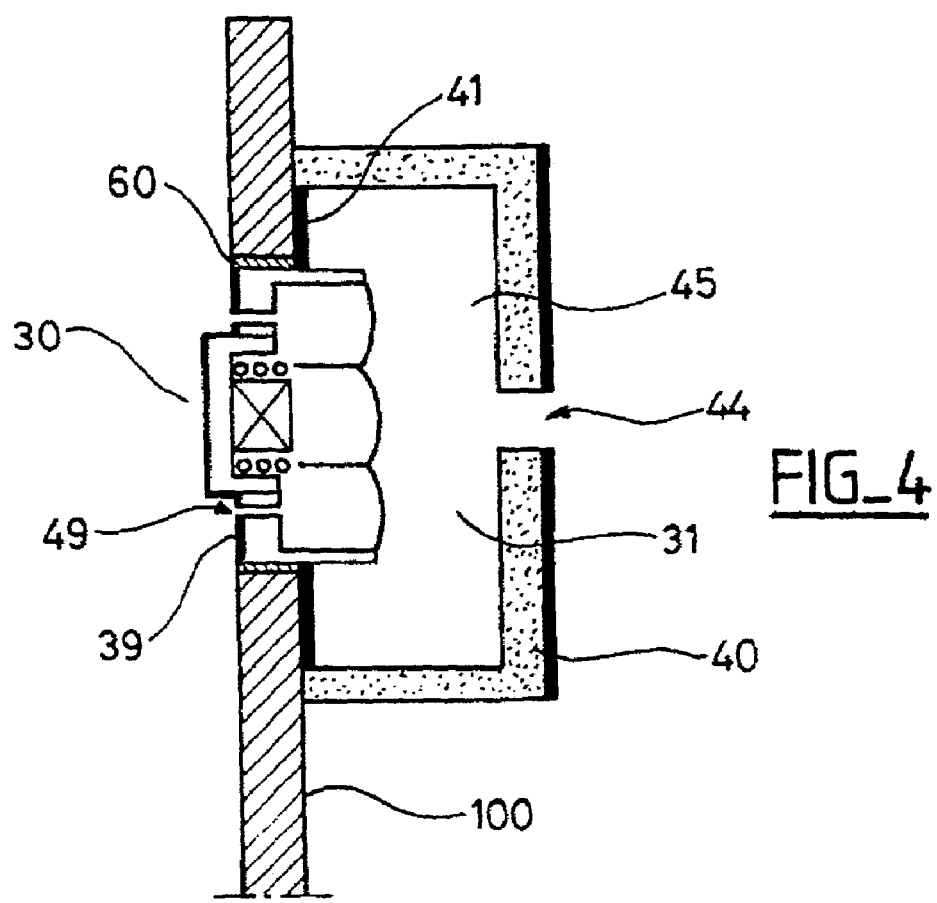
FIG_4

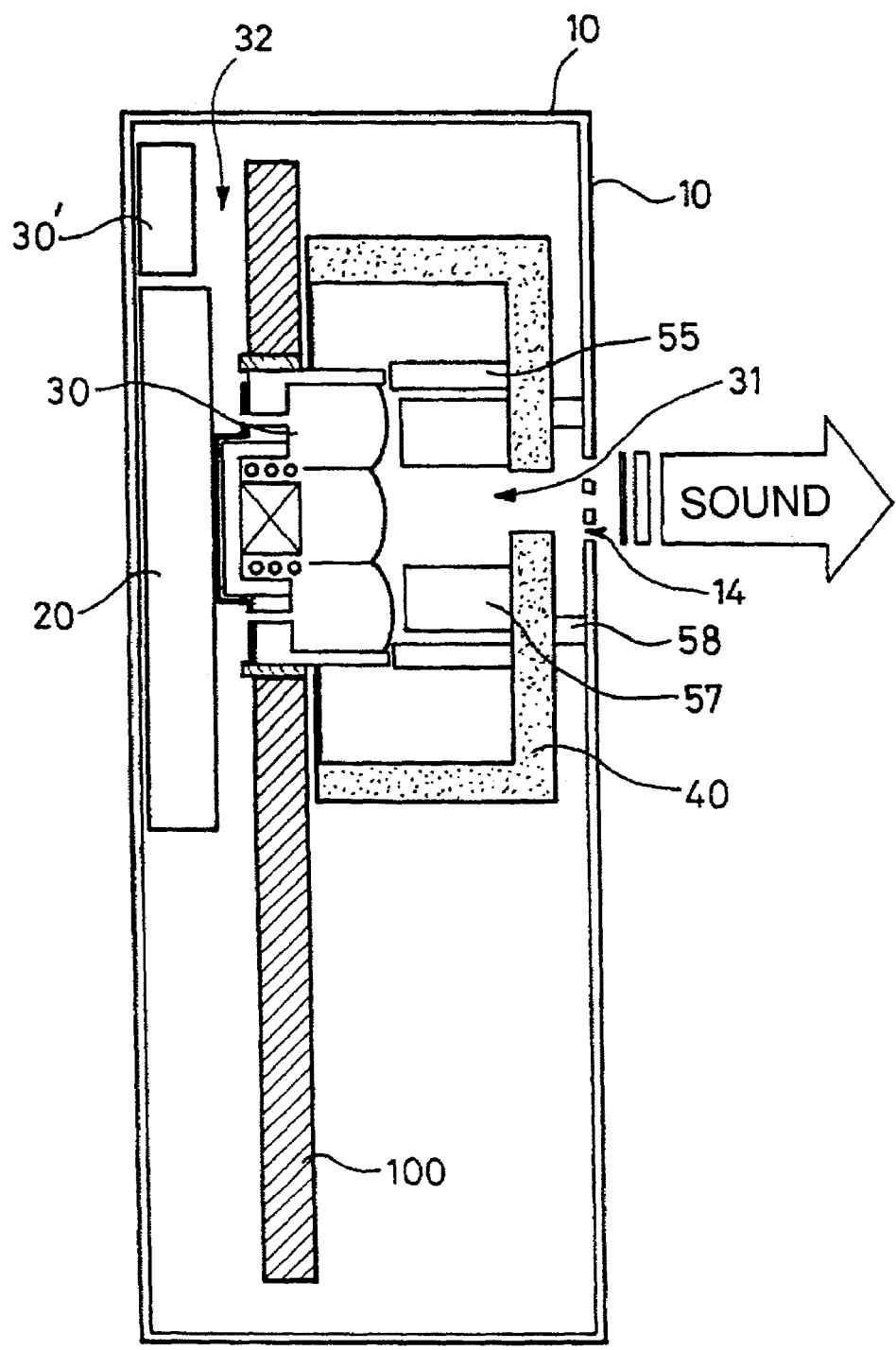
FIG_5

COMPONENT FOR A WIRELESS COMMUNICATION TERMINAL CONSTITUTING AN ANTENNA, LOUDSPEAKER AND RINGER

CROSS-REFERENCE TO RELATED APPLICATIONS

This application is based on French Patent Application No. 01 11 853 filed Sep. 13, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a structural arrangement for wireless communication terminals.

2. Description of the Prior Art

The current trend is to produce compact wireless communication terminals with functional and user friendly ergonomic features. A wireless communication terminal comprises a case in which are accommodated equipment units, in particular a radio transceiver unit comprising an antenna and a man-machine interface unit generally including a keypad, a screen and a sound transducer.

The search for improved convenience and ergonomics has led to housing the antenna inside the case, for example, through the development of patch planar antennas. The same trend is encouraging the provision of increasingly comprehensive man-machine interfaces of increasingly large size.

FIG. 1 shows diagrammatically the components of a wireless communication terminal, which generally comprises an insulative or partly metal rigid material case 10 containing components connected to a printed circuit 100. The terminal has a screen 20, a keypad 25, a battery 27, a wireless communication antenna 40, and a sound reproduction transducer 30 adapted to convert electrical signals that are fed to it into sound waves.

The sound transducer 30 can have several functions, such as those of an earpiece, a loudspeaker and a ringer. The earpiece is essentially intended to be placed against the ear of a user when using the device in a call, the ringer alerts the user to an incoming call or some other event, and the loudspeaker reproduces sound at a high volume, for example for hands-free use. To reproduce sound waves, the sound transducer 30 uses two separate volumes defining a front acoustic cavity 31 and a rear acoustic cavity 32 whose shapes and dimensions are chosen to achieve sound reproduction of sufficient quality for the application for which the transducer is intended.

In theory, the earpiece function requires a smaller component size than is required for a loudspeaker and ringer, which must emit a greater sound volume. The volume occupied by the sound transducer 30 can therefore not be reduced beyond a limit imposed by the loudspeaker function.

As previously mentioned, the current trend is to enlarge the man-machine interface, and in particular the screen, for example by using liquid crystal screens. Because the size of the keypad cannot be reduced, again for reasons of convenience in use, the present invention proposes to exploit the space occupied by the sound transducer to enlarge the space available to receive a screen, without commensurately decreasing the size of the keypad or increasing the size of the mobile terminal.

To this end, the invention proposes to retain only a simple earpiece on the front face of the terminal and to transfer the loudspeaker and the ringer function to the rear of the terminal, using the volume of the antenna as the front acoustic cavity.

SUMMARY OF THE INVENTION

The invention provides a structural arrangement for a wireless communication terminal including a case in which are disposed a sound transducer and a patch planar antenna connected to a printed circuit, the transducer having an electrically neutral portion comprising a vibrating membrane and an electrically conductive portion, the antenna incorporating a cavity delimited by a ground plane and a conductive patch disposed on a dielectric support, wherein the electrically neutral portion of the sound transducer is situated in the cavity of the antenna, the electrically conductive portion of the sound transducer constitutes a portion of the ground plane of the antenna, and the patch and the dielectric support of the antenna incorporate a slot facing the vibrating membrane of the sound transducer.

In one embodiment the sound transducer is disposed in a recess in the printed circuit.

According to one feature the ground plane of the antenna is perforated.

According to one feature elongation lugs hold the vibrating membrane away from the electrically conductive portion of the transducer.

According to one feature sound sealing covers across the cavity of the antenna delimit the front acoustic cavity of the transducer.

According to another feature volume adjusting seals across the cavity of the antenna restrict the front acoustic cavity on the transducer.

According to another feature acoustic seals delimit the front acoustic cavity between the antenna and the case of the terminal.

According to one feature the patch and the dielectric support of the antenna have a slot facing the vibrating membrane of the sound transducer.

According to another feature the case of the terminal incorporates an opening facing the slot in the antenna.

The invention also provides a component for a wireless communication terminal, the component constituting a patch planar antenna and a sound transducer and having an electrically neutral portion and an electrically conductive portion, the electrically neutral portion including a vibrating membrane situated in a cavity of the antenna delimited by a ground plane and a conductive patch, and the electrically conductive portion including electrically conductive members of the sound transducer constituting at least part of the ground plane of the antenna.

Thus the invention proposes a new component that might be referred to as an antenna/loudspeaker/ringer, these three items being advantageously combined to occupy a small space within the case of the wireless communication terminal. Furthermore, at the time of manufacture, these items can advantageously be made in the form of a single component.

The features and advantages of the invention will become more clearly apparent on reading the following description, which is given by way of illustrative and nonlimiting example and with reference to the accompanying drawings.

BRIEF DESCRIPTION OF THE DRAWING

FIG. 1, already described, shows diagrammatically the components of a wireless communication terminal.

FIGS. 2a and 2b show diagrammatically a patch planar antenna.

FIG. 3 shows diagrammatically a sound transducer.

FIG. 4 shows diagrammatically an antenna/loudspeaker/ringer component according to the invention.

FIG. 5 shows diagrammatically a structural arrangement according to the invention.

DETAILED DESCRIPTION OF THE PREFERRED EMBODIMENT

FIGS. 2a and 2b show a patch planar antenna. Patch planar antennas have been developed in opposition to the wire antennas conventionally used and are advantageously integrated into the case of the wireless communication terminal. The patch antenna 40 is disposed on one face of the printed circuit board 100 and includes a cavity 45 delimited by two conductive structures, namely a ground plane 41 and a conductive patch 42 disposed on a dielectric support 43. The ground plane 41 can comprise a single plane member, such as a conductive layer deposited on the board 100, or a plurality of coplanar conductive members, possibly each implemented on a different component. The conductive patch 42 is generally plane, but can be conformed if necessary, and held at a particular distance from the ground plane 41 by a rigid insulative support 43. The shapes and dimensions of the dielectric support 43 are the result of dimensional and structural choices to be made by the person skilled in the art according to the intended applications.

In a preferred embodiment, shown in FIG. 2a, the conductive patch 42 takes the form of a plane or quasi-plane conductive member constituted by an etched conductive layer carried by a thin substrate 43 or by a thin board. The patch 42 is extended by two folded or attached conductive lugs 46, 47 at its periphery, one of which provides a short circuit function, because it is connected directly to the ground plane 41, and the other of which provides an antenna feeder function in conjunction with a signal processing unit, not shown, of the radio transceiver unit.

The antenna 40 is preferably a dual band antenna. To enable dual band operation the patch 42 comprises a plane conductive member with a tapered U-shaped slot 44 in the central portion which passes through the thickness of the patch. The slot 44 delimits two plane areas on the surface of the patch; a first of these areas, called the inner area, corresponds for the most part to the portion of the patch that is inside the U-shape, and the second of these areas, referred to as the outer area, extends over the remainder of the patch beyond the inner area.

This kind of arrangement produces two resonances, one mainly in the inner area and the other mainly in the outer area, from the short circuit lug, one being substantially a quarter-wave resonance in the upper band and the other being a substantially quarter-wave resonance in the lower band, to enable the antenna to operate in the required two bands, the shapes and dimensions of the antenna being calculated to this end; all of this is known to the person skilled in the art.

FIG. 3 shows a sound transducer. In the conventional manner, the transducer 30 includes a vibrating membrane 33 disposed between a front cavity 31 and a rear cavity 32 as previously defined. The vibrating membrane 33 is secured by attachments to the walls of a shell 34 of the transducer so that it can be caused to vibrate freely by a coil 37 to which it is attached and which is in turn caused to vibrate by a magnet 38 disposed on a metal support 39, such as a frame. Thus two portions can be defined within the sound transducer 30, namely an electrically neutral first portion 35 including the membrane 33 and the shell 34, which are made of dielectric materials such as plastics materials, for example, and an electrically conductive second portion 36 including the coil 37, the magnet 38 and the frame 39, which are made of conductive materials.

For improved application of the invention, the transducer 30 can further include elongation lugs 50 which hold the vibrating membrane 33 away from the electrically conductive portion 36, for example at a distance of 0.3 mm or more. Because the elongation lugs 50 are in the electrically neutral portion 35, they are made of a dielectric material. The elongation lugs 50 can consist of rods or closed or semi-closed tubes disposed on the coil 37 of the transducer 30.

FIG. 4 shows diagrammatically the integration of the sound transducer 30 and the antenna 40 in one component. The invention proposes to use the cavity 45 of the patch antenna 40 as the front acoustic cavity 31, without this compromising the operation of the antenna. To this end, the electrically neutral portion 35 of the sound transducer 30 is disposed in the cavity 45 of the antenna 40 and the electrically conductive portion 36 of the transducer 30 constitutes at least a portion of the ground plane 41 of the antenna 40.

In one embodiment, the transducer 30 is disposed in a recess in the printed circuit board 100. Seals 60, preferably made of metal, can be provided. The electrically conductive portion 36 of the transducer 30 complements the hole in the ground plane 41 of the antenna to incorporate the front acoustic cavity of the transducer within the cavity of the antenna. The frame 39 of the transducer can advantageously be extended to provide better electrical continuity of the ground plane 41.

For the sound transducer 30 to be able to operate, the membrane 33 must be able to vibrate in a space in communication with the rear acoustic cavity 32. To this end, the ground plane 41 of the antenna must be perforated, i.e. incorporate at least one perforation 49 to allow circulation of air and sound waves between the membrane 33 and the rear cavity 32 situated in the case 10 of the wireless communication terminal. For example, a perforation 49 can be provided in the frame 39 of the transducer 30 if the latter is disposed in a recess in the printed circuit 100, or directly in the ground plane conductive layer 41. Local interruption of the ground plane 41 is already known in the art for some applications and does not compromise the operation of the antenna 40 provided that the overall electrical continuity of the ground plane 41 is maintained.

A slot 44 is formed in the antenna 40 facing the vibrating membrane 33 in order to allow sound waves to propagate to the outside. This slot 44 can advantageously correspond to the slot formed in the patch 42 of a dual band antenna, as previously described. In the context of the present invention, this slot 44 must also extend through the dielectric support 43 of the antenna 40.

In another embodiment, not shown, the transducer can be disposed on one face of the printed circuit board and therefore be entirely included within the cavity of the antenna. Correct operation of the antenna can nevertheless be guaranteed if the electrical continuity of the ground plane is maintained despite the non-coplanar planes that constitute it.

FIG. 5 shows a structural arrangement in accordance with the present invention. A large screen 20 can be used because the front face of the case 10 of the wireless communication terminal includes only a small sound transducer 30' for a simple earpiece function. The loudspeaker and ringer functions are provided by the sound transducer 30 integrated into the antenna 40 in the arrangement proposed by the present invention.

The front acoustic cavity 31 of the sound transducer 30 is incorporated into the cavity 45 defined by the conductive members 41, 42 of the patch antenna 40. For optimum operation, it is advantageous to delimit the front acoustic cavity 31 clearly and even to restrict it to obtain a wider sound spectrum. It is therefore proposed to fit acoustic seal covers 55 across the cavity 45 of the antenna to delimit the front acoustic cavity 31 of the transducer 30 and to fit acoustic seals 58 to delimit the front acoustic cavity 31 between the antenna 40 and the case 10 of the terminal.

Volume adjusting seals 57 can advantageously also be disposed in the cavity 45 of the antenna to reduce the front acoustic cavity 31 of the transducer 30 and thereby widen the sound spectrum.

Because the covers and seals 55 and 58 and the volume adjusting seals are disposed in the cavity 45 of the antenna 40, they are made of dielectric materials, such as plastics materials or foams.

Furthermore, it is preferable for the case 10 of the terminal to incorporate an opening 14 facing the slot 44 in the antenna 40 to enable sound waves to propagate to the outside.

There is claimed:

1. A structural arrangement for a wireless communication terminal including a case in which are disposed a sound transducer and a patch planar antenna connected to a printed circuit, said transducer having an electrically neutral portion comprising a vibrating membrane and an electrically conductive portion, said antenna incorporating an acoustic cavity delimited by a ground plane and a conductive patch disposed on a dielectric support, wherein said electrically neutral portion of said sound transducer is situated in said acoustic cavity of said antenna, said electrically conductive portion of said sound transducer constitutes a portion of said ground plane of said antenna, and said patch and said dielectric support of said antenna contain a common slot which faces said vibrating membrane of said sound transducer, and which outputs the sound produced by said vibrating membrane.

2. The structural arrangement claimed in claim 1 wherein said sound transducer is disposed in a recess in said printed circuit.

3. The structural arrangement claimed in claim 1 wherein said ground plane of said antenna is perforated.

4. The structural arrangement claimed in claim 1 wherein elongation lugs hold said vibrating membrane away from said electrically conductive portion of said transducer.

5. The structural arrangement claimed in claim 1, wherein said acoustic cavity is a front acoustic cavity of said sound transducer, wherein said vibrating membrane of said sound transducer is disposed between said front acoustic cavity and a rear acoustic cavity, and wherein sound sealing covers across said cavity of said antenna delimit said front acoustic cavity of said transducer.

6. The structural arrangement claimed in claim 5, further including volume adjusting seals across said front acoustic cavity to reduce the volume thereof.

7. The structural arrangement claimed in claim 1, wherein said acoustic cavity is a front acoustic cavity of said sound transducer, wherein said vibrating membrane of said sound transducer is disposed between said front acoustic cavity and a rear acoustic cavity, and wherein acoustic seals delimit said front acoustic cavity between said antenna and said case of said wireless communication terminal.

8. The structural arrangement claimed in claim 1, wherein said case of said wireless communication terminal incorporates an opening facing said slot in said antenna.

9. A component for a wireless communication terminal, said component constituting a patch planar antenna and a sound transducer and having an electrically neutral portion and an electrically conductive portion, said electrically neutral portion including a vibrating membrane situated in an acoustic cavity of said patch antenna delimited by a ground plane and a conductive patch disposed on a dielectric support, said electrically conductive portion including electrically conductive members of said sound transducer constituting at least part of said ground plane of said antenna, wherein said dielectric support and said patch antenna contain a common slot which faces said vibrating membrane and which outputs the sound produced by said vibrating membrane.

* * * * *